(12) United States Patent
Moser

(10) Patent No.: US 9,164,872 B2
(45) Date of Patent: Oct. 20, 2015

(54) TRACKING OF PROGRAM OBJECTS DURING REQUEST PROCESSING

(71) Applicant: Martin Moser, Speyer (DE)

(72) Inventor: Martin Moser, Speyer (DE)

(73) Assignee: SAP SE, Walldorf (DE)

( * ) Notice: Subject to any disclaimer, the term of this patent is extended or adjusted under 35 U.S.C. 154(b) by 197 days.

(21) Appl. No.: 13/900,396

(22) Filed: May 22, 2013

(65) Prior Publication Data

US 2014/0351656 A1    Nov. 27, 2014

(51) Int. Cl.
*G06F 11/36* (2006.01)
*G06F 9/44* (2006.01)
*G06F 11/30* (2006.01)

(52) U.S. Cl.
CPC ............ *G06F 11/3636* (2013.01); *G06F 11/30* (2013.01); *G06F 11/362* (2013.01)

(58) Field of Classification Search
None
See application file for complete search history.

(56) References Cited

U.S. PATENT DOCUMENTS

| | | | |
|---|---|---|---|
| 7,725,771 B2 | 5/2010 | Wintergerst et al. | |
| 7,765,528 B2 | 7/2010 | Findeisen et al. | |
| 7,827,538 B2 | 11/2010 | Trotter | |
| 7,991,961 B1* | 8/2011 | Tsai et al. | 711/132 |
| 8,037,477 B2 | 10/2011 | Findeisen et al. | |
| 8,195,720 B2 | 6/2012 | Hwang | |
| 8,522,216 B2 | 8/2013 | Otenko | |
| 2004/0078540 A1* | 4/2004 | Cirne et al. | 711/170 |
| 2005/0091646 A1* | 4/2005 | Chilimbi et al. | 717/130 |
| 2005/0204342 A1 | 9/2005 | Broussard | |
| 2006/0136530 A1 | 6/2006 | Rossmann | |
| 2007/0027942 A1* | 2/2007 | Trotter | 707/205 |
| 2007/0250820 A1* | 10/2007 | Edwards et al. | 717/131 |
| 2007/0255774 A1 | 11/2007 | Topchiyski | |
| 2007/0255775 A1 | 11/2007 | Manolov et al. | |
| 2008/0127212 A1* | 5/2008 | Nakamizo et al. | 719/315 |
| 2008/0209404 A1* | 8/2008 | Brady | 717/128 |
| 2008/0244547 A1 | 10/2008 | Wintergerst et al. | |
| 2008/0301646 A1* | 12/2008 | Gupta | 717/127 |
| 2009/0210750 A1 | 8/2009 | Cates | |
| 2009/0328007 A1* | 12/2009 | Chen et al. | 717/128 |
| 2010/0205230 A1 | 8/2010 | Simeonov et al. | |
| 2011/0029822 A1 | 2/2011 | Moser | |
| 2011/0078666 A1* | 3/2011 | Altekar | 717/131 |

(Continued)

OTHER PUBLICATIONS

Mitchell et al., "LeakBot: An Automated and Lightweight Tool for Diagnosing Memory Leaks in Large Java Applications," 2003, ECOOP 2003—Object-Oriented Programming Lecture Notes in Computer Science vol. 2743, pp. 351-377.*

Hauswirth et al., "Low-overhead memory leak detection using adaptive statistical profiling," 2004, ASPLOS XI Proceedings of the 11th international conference on Architectural support for programming languages and operating systems, pp. 156-164.*

Qin et al., "SafeMem: exploiting ECC-memory for detecting memory leaks and memory corruption during production runs," 2005, 11th International Symposium on High-Performance Computer Architecture, pp. 291-302.*

*Primary Examiner* — Thuy Dao
*Assistant Examiner* — Stephen Berman
(74) *Attorney, Agent, or Firm* — Mintz Levin Cohn Ferris Glovsky and Popeo, P.C.

(57) ABSTRACT

Coding issues that create runtime memory leaks, for example in programs coded in a platform-independent programming language such as Java™, can be isolated at the program code line level. An allocation trace that retains, in active memory, a unique object identifier for each of a plurality of objects instantiated during program execution and an address in the active memory where each object is stored can be created. Memory leak candidates can be identified by directly examining contents of the active memory to identify one or more data structures that are increasing in size over time. The allocation trace can be combined with the identified memory leak candidates to generate information about at least one identified leaking object.

19 Claims, 3 Drawing Sheets

(56) References Cited

U.S. PATENT DOCUMENTS

2013/0132699 A1* 5/2013 Vaishampayan et al. ..... 711/170
2013/0173961 A1 7/2013 Moser
2014/0189438 A1* 7/2014 Arbel et al. ................ 714/47.1

* cited by examiner

TRACKING OF PROGRAM OBJECTS DURING REQUEST PROCESSING

TECHNICAL FIELD

The subject matter described herein relates to identifying memory leaks in programming environments, for example in platform-independent programming language environments.

BACKGROUND

Currently available Java™-based enterprise servers can typically include several thousand technical components that generate hundreds of thousands (or even larger numbers) of data records. Each of the components and data records is capable of generating or storing data. Java™ (available from Oracle Corporation of Redwood City, Calif.) and other platform-independent programming languages (referred to throughout this disclosure with the generic term "platform-independent programming language") generally do not require manual management of every bit of application memory. A process referred to as garbage collection generally includes functionality that removes from system memory objects that are no longer needed. Effective garbage collection in a platform-independent programming language aids memory management by eliminating unwanted data, also called garbage. However, currently available garbage collection programs do not address all memory problems. For example, memory leaks in a platform-independent programming language can be difficult to find, detect, and eliminate. In other words, it is not always clear, particularly during runtime, which objects are no longer needed. Memory leaks can result from design and implementation errors (for example, a reference to an object being retained beyond the useful life of the object). Thus, currently available garbage collection approaches can only detect and eliminate typical heap management problems, but are little help in finding memory leaks. Memory leaks can be harmful, because eventually they can lead to a crash of the virtual machine within which platform-independent programming language code executes.

Existing tools, such as allocation traces and heap dumps, do not generally allow identification of the statements where those objects are allocated that contribute to the memory leak. Determining which combination of object creation and data structure manipulation causes a leak is a task that can require a thorough understanding of the code. Unfortunately, memory leaks are often detected long after the code was written, which can lead to challenges in understanding what parts of the code are the likely sources of a problematic object reference. Even with well-understood code, however, the task of identifying a memory leak can be tedious, and can require significant effort and potentially collaboration among several people (e.g. the developer, a software testing team, end users experiencing the memory leaks, etc.). For at least these reasons, memory leaks often take several months to rectify.

Co-pending and co-owned U.S. Patent Application Publication No. 2011/0029822A1 describes approaches to identifying statements in a program coded using a platform-independent programming language that allocate objects in a manner that could contribute to a memory leak. An allocation trace and a heap dump are created, and the heap dump is used to identify which data structures are leaking. The allocation trace records where objects are allocated. The information on the leaking data structures extracted from the heap dump is combined with the allocation information produced by the allocation trace. An algorithm can identify objects that are part of the leaking data structure and locations in the platform-independent programming language where the identified objects are allocated in the code.

SUMMARY

One or more implementations of the current subject matter can provide improved efficiency relative to currently available approaches for memory management, garbage collection, elimination of memory leaks, and the like. Information can be processed directly while it is still in memory, which can be significantly more efficient.

In one aspect, a method includes creating an allocation trace for a running program that is suspected of causing or known to cause memory leaks, identifying at least one memory leak candidate, generating information about an identified leaking object, and promoting the information about the identified leaking object. The creating includes retaining, in active memory, a unique object identifier for each of a plurality of objects instantiated during program execution and an address in the active memory where each object is stored. The identifying includes directly examining contents of the active memory to identify one or more data structures that are increasing in size over time. The generating includes extracting the plurality of objects from the allocation trace as extracted candidate objects, determining for each candidate extracted object of the plurality of candidate objects whether the extracted candidate object is one of the at least one memory leak candidate, and identifying the extracted candidate object as the identified leaking object.

In some variations one or more of the following features can optionally be included in any feasible combination. The method can optionally further include one stopping the program prior to the identifying of the memory leak candidates, and resuming execution of the program after the generating of the information about the one or more identified leaking objects. The identifying can further include searching for one or more distorted data structures in the active memory. The one or more distorted data structures can include at least one of a list of objects exceeding a first reference number of objects, an unbalanced table, and a hash table exceeding a second reference number of objects. The identifying can further include monitoring the active memory for at least one of a consistently increasing usage in conjunction with one or more out of memory errors, a degradation in performance of one or more processors on which the program is executed, and a byte code insertion technique to track insertions and deletions into a data structure of the one or more data structures. The information about the identified leaking object can include a location in the program code where identified leaking object is allocated.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A heap dump as used in the aforementioned currently available approach to memory allocation error identification can require a writing of the heap contents (which can be a very large file) to a hard drive and then subsequently reading the heap contents from disk to extract information on the leaking data structures. Processing this information directly while it is still in system memory can be significantly more efficient. Accordingly, implementations of the current subject matter can, among other possible advantages, provide a simplified approach that avoids the need for a heap dump.

A memory leak can occur if a program creates objects, holds them in some data structure, such as, for example, a hash table or list, but does not release the objects even if they are no longer used. This scenario can cause a data structure holding these objects to grow without limit. Under such conditions, a virtual machine (e.g. a Java™ virtual machine or JVM) will eventually can run out of memory. When available memory is exceeded by the size of data structures, program execution is terminated with an "out of memory" error.

A growing data structure can be identified when searching for a memory leak. Since the data structure holds the leaking objects, identifying growing data structures can also identify an existence of the memory leak. However, simply identifying the existence of the memory leak does not indicate how or why the memory leak occurred. In other words, information about the existence of a memory leak obtained from a heap dump typically provides no identification of a location or locations in the executable program code. An allocation trace, on the other hand, typically does not contains information regarding the specific data structure that eventually holds a created object after the processing of a user interaction has been completed.

Figure 1:
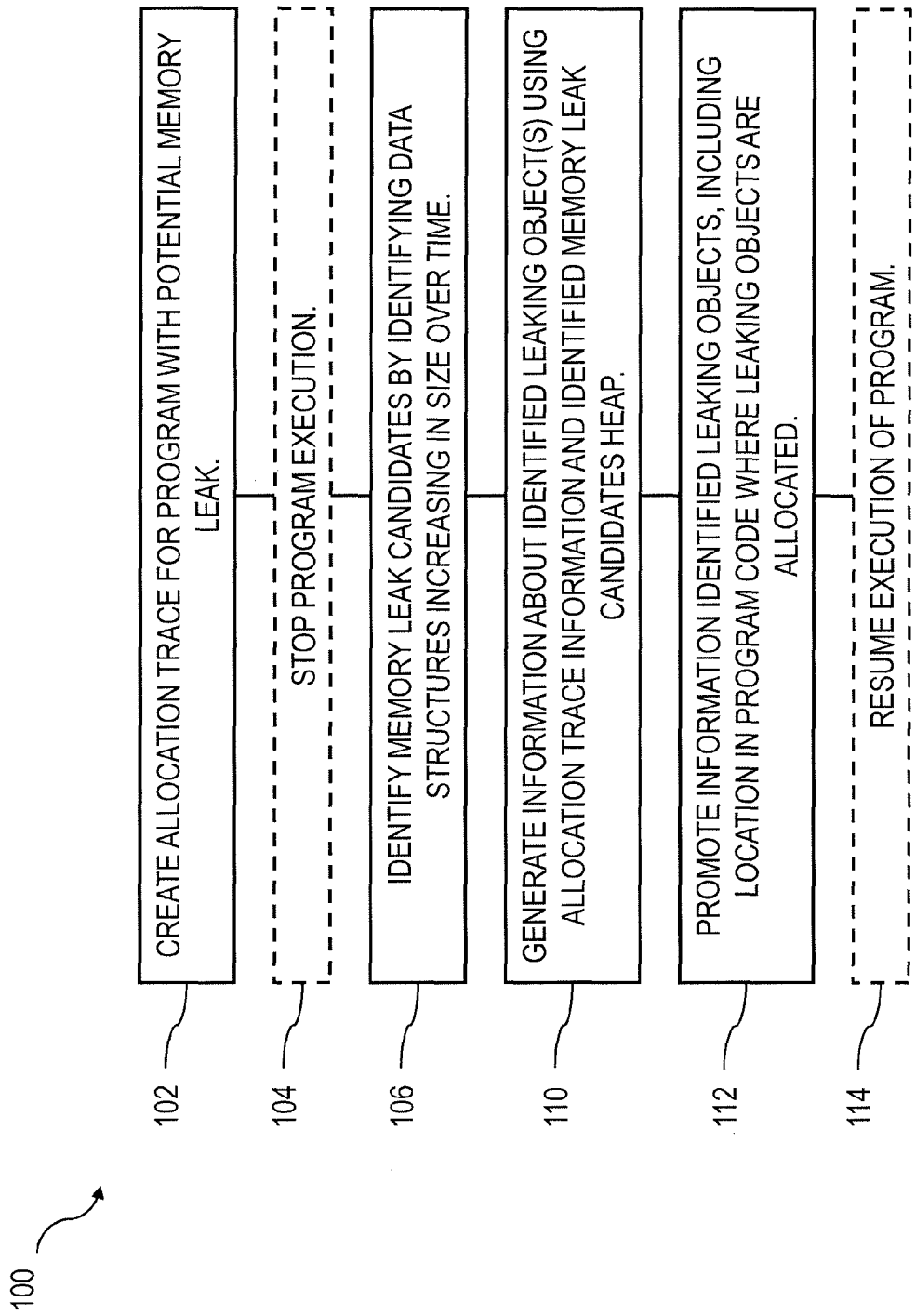
FIG. 1 is a process flow diagram illustrating aspects of a method having one or more features consistent with implementations of the current subject matter.

FIG. 1 shows a process flow chart 100 illustrating features of a method consistent with an implementation of the current subject matter. One or more of these features can be included in other implementations. At 102, an allocation trace is created for a program that is suspected of causing or known to cause memory leaks. The allocation trace results can be retained in active memory for use as discussed below. The program can be coded in a platform-independent programming language. The allocation trace can include a list containing, for each object allocated by the running program, a memory address where the object was allocated, the object's class, and the code line of that class where the object was allocated. In some examples, the allocation trace can be performed on a request sent from a client to a server. In response to the request, a unique object identifier is recorded for objects created by the program. The unique object identifier can be a string that includes a fully qualified class name of an object, the object's hash code, and the like. Using this information, a data defining class of the object can be determined. An address in the memory (heap) where the object is stored can also be included, for example as a hexadecimal number.

Execution of the program can be stopped at 104, for example to ensure that invalid results are not returned by the memory usage analysis. The sources of memory leaks are found using unique identifiers of objects. In some platform independent programming languages, the virtual machine (e.g. a Java™ virtual machine) uses memory address of objects as the unique identifiers. Memory addresses, however, may not be stable with respect to a garbage collection process because garbage collection may rearrange objects in memory. As a consequence of objects being rearranged during garbage collection, a unique identifier (e.g. a memory address recorded during an allocation trace can in some examples no longer match the memory address of a leaking object while analyzing the memory for leaks and their sources. A source of a memory leak can accordingly be missed during the analysis discussed herein. Stopping of program execution can therefore be advantageous in preventing garbage collection processes from causing instability in the unique identifiers.

Further referring to FIG. 1, memory leak candidates are identified at 106 by examining contents of the heap (i.e. the active memory, the memory used by the application, etc.). The identifying can include identifying one or more data structures that are increasing in size over time, and does not require a heap dump. Instead, the memory leak candidates are identified by directly examining contents of the active memory. Such data structures can be detected using various approaches. For example, suspected memory leaks can be identified by counting or otherwise determining a number of objects in data structures. Specifically, in some implementations of the current subject matter, memory leak candidates can be identified by searching for "distorted" data structures, which can include very long lists (e.g., lists of objects exceeding a reference number of objects), unbalanced trees (e.g. unbalanced tree structures in memory, such as B-trees for database indexes and the like), hash tables with a very large number of entries (e.g., a number of entries exceeding a reference number of entries), or other types of similar irregularities. One or more heuristic tests can be performed to determine whether a data structure leaks. For example, memory leakage tests can include monitoring the active memory for any consistently increasing usage in conjunction with out of memory errors, degradation in performance of one or more processors on which the program is executed, via use of byte code insertion techniques to track insertions and deletions into the data structure, and the like. The objects in the identified leaking data structures can be designated as memory leak candidates.

At 110, information from the allocation trace and the identified memory leak candidates in the heap is combined to generate information about one or more identified leaking objects. This generating can include obtaining one or more locations in the program code where objects that contribute to leaking data structures are allocated. For example, objects instantiated during program execution can be extracted from the allocation trace as extracted candidate objects. The unique object identifier for each extracted candidate object can then be retrieved from the allocation trace. The combining of the allocation trace information and the designated memory leak candidates in the heap can include determining, for each extracted candidate object from the allocation trace, whether the extracted candidate object was designated as a memory leak candidate through identifying the leaking data structures (e.g. at 106).

If an extracted candidate object (i.e. one extracted from the allocation trace) is not one of the designated memory leak candidates (i.e. not an object in an identified leaking data structure), that extracted candidate object can be assumed to not be responsible for a memory leak, and the process can proceed to a next extracted candidate object. When an extracted candidate object is found to be a designated memory leak candidate (i.e. an object in an identified leaking data structure), this extracted candidate object becomes an identified leaking object.

At 112, the information about one or more identified leaking objects, including a location in the program code where the one or more identified leaking objects are allocated is promoted. The promoting can include one or more of providing a graphical output to a user, a textual output, some other visual output, an audible output, an electronic message (e.g. a text message, an e-mail, part of a rich site summary or RSS feed), storing a record of the information in a database, etc. At 114, execution of the program is resumed.

Figure 2:
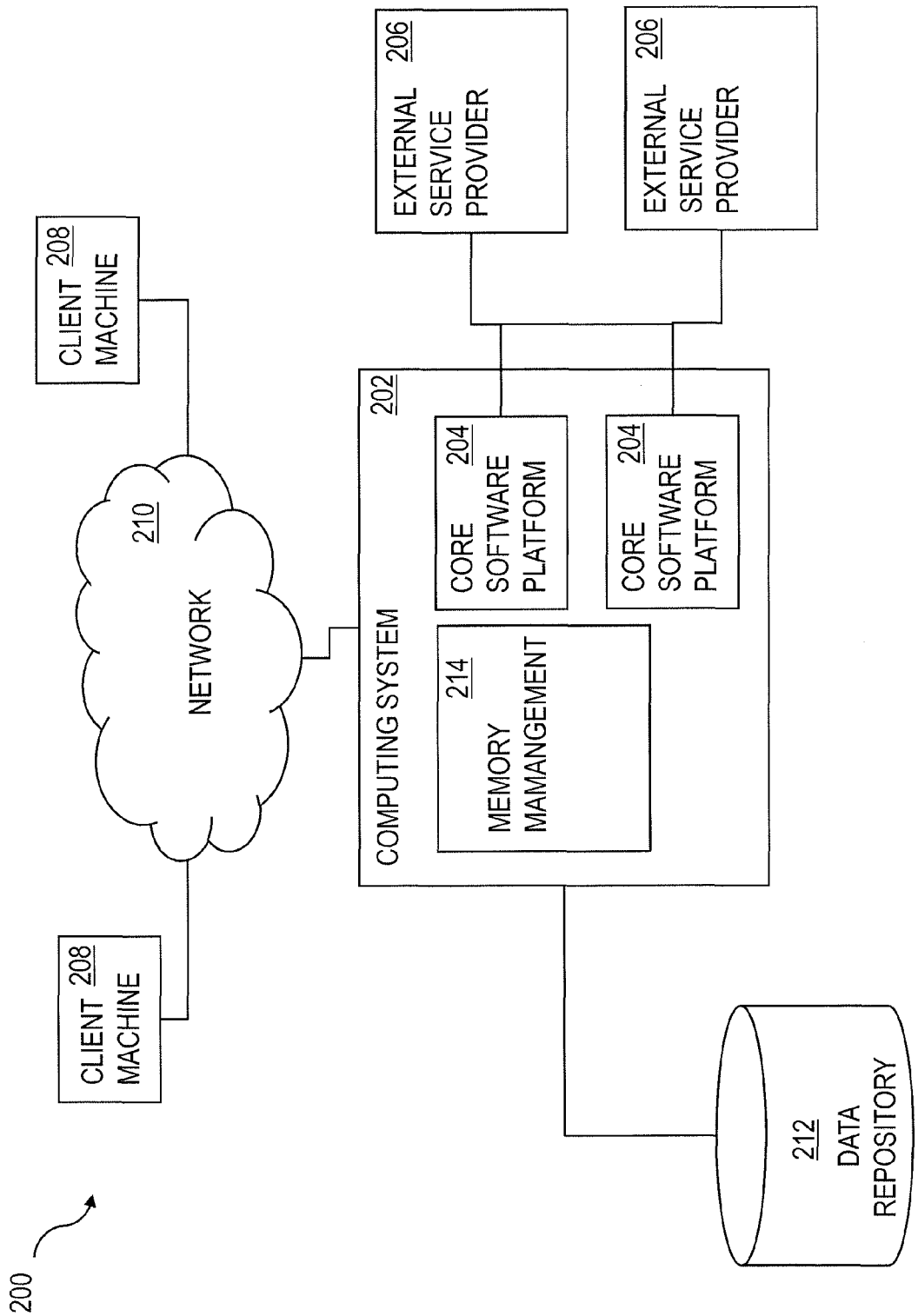
FIG. 2 is a diagram illustrating aspects of a system showing features consistent with implementations of the current subject matter.

Features of the current subject matter can optionally be implemented as part of an enterprise resource planning (ERP) system, other business software architecture, other integrated technology software platform, or the like. FIG. 2 shows a diagram illustrating example features of a framework 200 in which a software platform is provided as a standalone, customized software installation that runs on one or more processors under the control of a single organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. A computing system 202 can include one or more core software platform modules 204 providing one or more features of the business software system. The one or more core software platform modules 204 as well as other functionality of the business software architecture can be implemented in a platform-independent programming language, and can, in some cases, include one or more problematic sets of instructions in the code that result in memory leaks when executed. For example, various data and programming objects and the like can be created by an application or other program and retained in a memory structure (e.g., system memory) but improperly identified for removal from system memory when they are no longer referenced by other objects.

The computing system can also aggregate or otherwise provide a gateway via which users or program running on the computing system 202 can access functionality provided by one or more external software components 206, which can be developed by one or more external service providers (i.e. developers other than the developer of the core software platform 204). External software components 206 can also include functionality implemented in a platform-independent programming language. Client machines 208 can access the computing system 202, either via a direct connection, a local terminal, or over a network 210 (e.g. a local area network, a wide area network, a wireless network, the Internet, or the like). Client machines 208 can include a computing device operating a one or more of a Web client (e.g., a browser), a small device Web client (e.g., a browser without a script engine), a programmatic client, or the like. The one or more core software platform modules 204 can access one or more data repositories 212 (e.g. process repositories, scenarios repositories, transactional data repositories, metadata repositories, etc.) that can store definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process.

A memory management agent 214 can be hosted on the computing system 202 or alternatively, on an external system accessible over the network 210 or other network connection. The memory management agent 214 can optionally include one or more discrete software and/or hardware modules that perform operations such as those described herein. The memory management agent 214 can include a back-end component integrated into a Java™ virtual machine (or, alternatively, into a virtual machine of another platform-independent programming language), and can optionally include a front end component, which can be implemented on a client machine 208. The back-end component can record resource consumption information of programs running in the virtual machine and can optionally send such information to the front-end component for further processing, for example via a debug connection of the virtual machine.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 3:
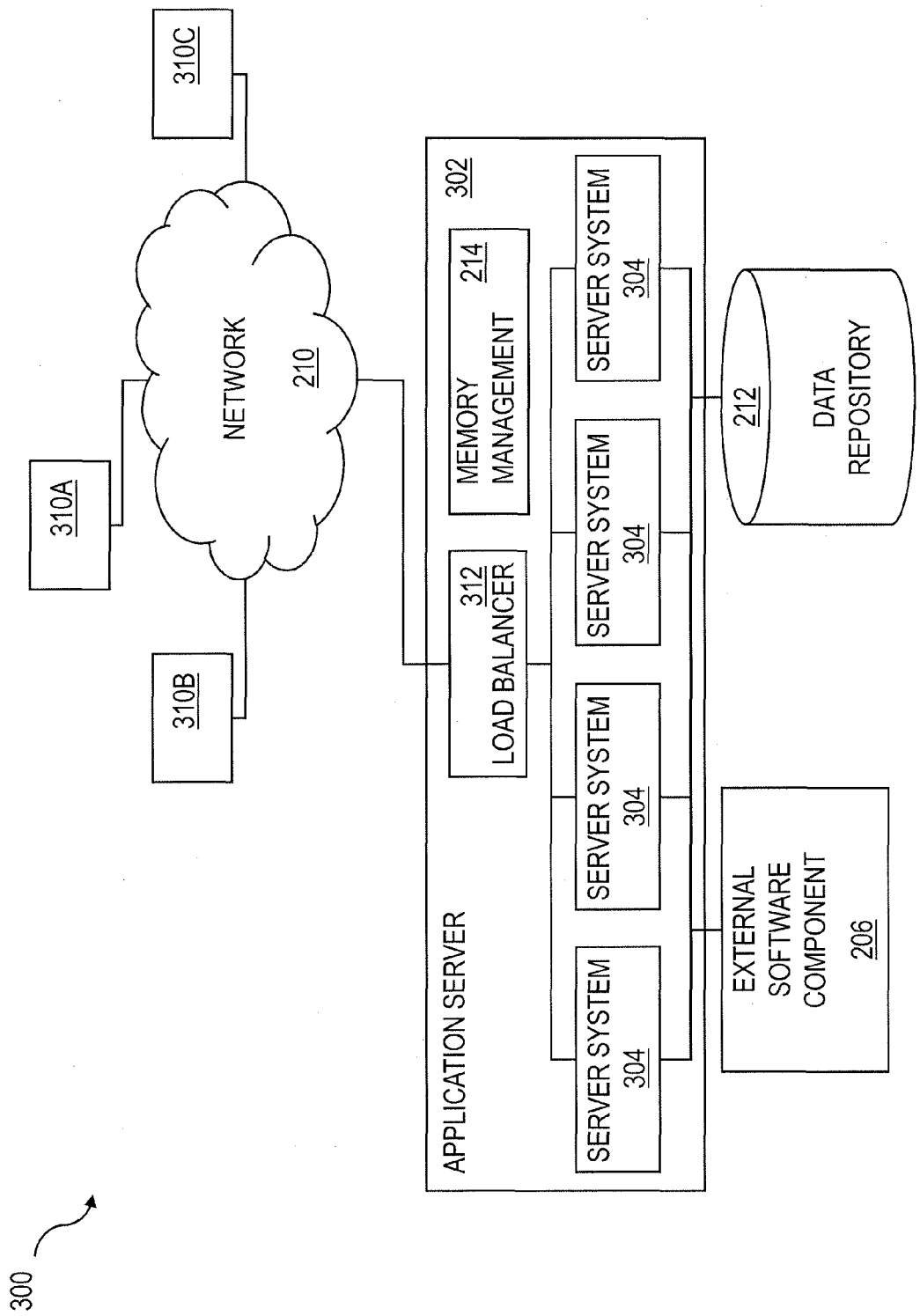
FIG. 3 is a diagram illustrating aspects of another system showing features consistent with implementations of the current subject matter.

FIG. 3 shows a block diagram of a multi-tenant implementation of a software delivery framework 300 that includes an application server 302, which can in some implementations include multiple server systems 304 that are accessible over a network 210 from client machines operated by users at each of multiple organizations 310A-310C (referred to herein as "tenants" of a multi-tenant system) supported by a single software delivery architecture 300. For a system in which the application server 302 includes multiple server systems 304, the application server can include a load balancer 312 to distribute requests and actions from users at the one or more organizations 310A-310C to the one or more server systems 304. Instances of the core software platform 204 (not shown in FIG. 3) can be executed in a distributed manner across the server systems 304. A user can access the software delivery architecture across the network using a thin client, such as for example a web browser or the like, or other portal software running on a client machine. The application server 302 can access data and data objects stored in one or more data repositories 212. The application server 302 can also serve as a middleware component via which access is provided to one or more external software components 206 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 302 that includes multiple server systems 304 that handle processing loads distributed by a load balancer 312. Potential benefits from such an arrangement can include, but are not limited to, high and reliably continuous application server availability and minimization of unplanned downtime, phased updating of the multiple server systems 304 to permit continuous availability (one server system 304 can be taken offline while the other systems continue to provide services via the load balancer 312), scalability via addition or removal of a server system 304 that is accessed via the load balancer 312, and de-coupled lifecycle processes (such as for example system maintenance, software upgrades, etc.) that enable updating of the core software independently of tenant-specific customizations implemented by individual tenants.

A memory management agent 214 similar to that discussed above in reference to FIG. 2 can be hosted on the computing system 202 or alternatively, on an external system accessible over the network 210 or other network connection.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above.

In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
creating an allocation trace for a running program that is suspected of causing or known to cause memory leaks, the creating comprising retaining, in active memory, a unique object identifier for each of a plurality of objects instantiated during program execution and an address in the active memory where each object is stored;
identifying at least one memory leak candidate, the identifying comprising directly examining contents of the active memory to identify one or more data structures that are increasing in size over time;
generating information about an identified leaking object, the generating comprising extracting the plurality of objects from the allocation trace as extracted candidate objects, determining for each candidate extracted object of the plurality of candidate objects whether the extracted candidate object is one of the at least one memory leak candidate, and identifying the extracted candidate object as the identified leaking object;
promoting the information about the identified leaking object, and
wherein the directly examining contents of the active memory occurs during program execution, without a heap dump.

2. A computer program product as in claim 1, wherein the operations further comprise: stopping the program prior to the identifying of the memory leak candidates.

3. A computer program product as in claim 2, wherein the operations further comprise: resuming execution of the program after the generating of the information about the one or more identified leaking objects.

4. A computer program product as in claim 1, wherein the identifying further comprises: searching for one or more distorted data structures in the active memory, the one or more distorted data structures comprising at least one of a list of objects exceeding a first reference number of objects, an unbalanced table, and a hash table exceeding a second reference number of objects.

5. A computer program product as in claim 1, wherein the identifying further comprises: monitoring the active memory for at least one of a consistently increasing usage in conjunction with one or more out of memory errors, a degradation in performance of one or more processors on which the program is executed, and a byte code insertion technique to track insertions and deletions into a data structure of the one or more data structures.

6. A computer program product as in claim 1, wherein the information about the identified leaking object comprises a location in the program code where identified leaking object is allocated.

7. A system comprising:
at least one programmable processor; and
a machine-readable medium storing instructions that, when executed by the at least one processor, cause the at least one programmable processor to perform operations comprising:
creating an allocation trace for a running program that is suspected of causing or known to cause memory leaks, the creating comprising retaining, in active memory, a unique object identifier for each of a plurality of objects instantiated during program execution and an address in the active memory where each object is stored;
identifying at least one memory leak candidate, the identifying comprising directly examining contents of the active memory to identify one or more data structures that are increasing in size over time;
generating information about an identified leaking object, the generating comprising extracting the plurality of objects from the allocation trace as extracted candidate objects, determining for each candidate extracted object of the plurality of candidate objects whether the extracted candidate object is one of the at least one memory leak candidate, and identifying the extracted candidate object as the identified leaking object;
promoting the information about the identified leaking object; and
wherein the directly examining contents of the active memory occurs during program execution, without a heap dump.

8. A system as in claim 7, wherein the operations further comprise: stopping the program prior to the identifying of the memory leak candidates.

9. A system as in claim 8, wherein the operations further comprise: resuming execution of the program after the generating of the information about the one or more identified leaking objects.

10. A system as in claim 7, wherein the identifying further comprises: searching for one or more distorted data structures in the active memory, the one or more distorted data structures comprising at least one of a list of objects exceeding a first reference number of objects, an unbalanced table, and a hash table exceeding a second reference number of objects.

11. A system as in claim 7, wherein the identifying further comprises: monitoring the active memory for at least one of a consistently increasing usage in conjunction with one or more out of memory errors, a degradation in performance of one or more processors on which the program is executed, and a byte code insertion technique to track insertions and deletions into a data structure of the one or more data structures.

12. A system as in claim 7, wherein the information about the identified leaking object comprises a location in the program code where identified leaking object is allocated.

13. A computer-implemented method comprising:
creating an allocation trace for a running program that is suspected of causing or known to cause memory leaks, the creating comprising retaining, in active memory, a unique object identifier for each of a plurality of objects instantiated during program execution and an address in the active memory where each object is stored;
identifying at least one memory leak candidate, the identifying comprising directly examining contents of the active memory to identify one or more data structures that are increasing in size over time;
generating information about an identified leaking object, the generating comprising extracting the plurality of objects from the allocation trace as extracted candidate objects, determining for each candidate extracted object of the plurality of candidate objects whether the extracted candidate object is one of the at least one memory leak candidate, and identifying the extracted candidate object as the identified leaking object;
promoting the information about the identified leaking object; and wherein the directly examining contents of the active memory occurs during program execution, without a heap dump.

14. A computer-implemented method as in claim 13, further comprising: stopping the program prior to the identifying of the memory leak candidates.

15. A computer-implemented method as in claim 14, further comprising: resuming execution of the program after the generating of the information about the one or more identified leaking objects.

16. A computer-implemented method as in claim 13, wherein the identifying further comprises: searching for one or more distorted data structures in the active memory, the one or more distorted data structures comprising at least one of a list of objects exceeding a first reference number of objects, an unbalanced table, and a hash table exceeding a second reference number of objects.

17. A computer-implemented method as in claim 13, wherein the identifying further comprises: monitoring the active memory for at least one of a consistently increasing usage in conjunction with one or more out of memory errors, a degradation in performance of one or more processors on which the program is executed, and a byte code insertion technique to track insertions and deletions into a data structure of the one or more data structures.

18. A computer-implemented method as in claim 13, wherein the information about the identified leaking object comprises a location in the program code where identified leaking object is allocated.

19. A computer-implemented method as in claim 13, wherein at least one of the creating, the identifying, the generating, and the promoting is performed by a system comprising at least one programmable processor.

* * * * *